(12) United States Patent
Alix et al.

(10) Patent No.: US 7,381,376 B2
(45) Date of Patent: Jun. 3, 2008

(54) STEAM GENERATOR

(75) Inventors: Guy-Paul Alix, Brest (FR); Stephane Lintanff, Le Bourg (FR)

(73) Assignee: L'Industrielle du Ponant SA., Landernau Cedex (FR)

( * ) Notice: Subject to any disclaimer, the term of this patent is extended or adjusted under 35 U.S.C. 154(b) by 1165 days.

(21) Appl. No.: 10/050,210

(22) Filed: Jan. 15, 2002

(65) Prior Publication Data

US 2002/0134321 A1    Sep. 26, 2002

(30) Foreign Application Priority Data

Jan. 16, 2001   (FR) .................................. 01 00505

(51) Int. Cl.
*B32B 5/02* (2006.01)
(52) U.S. Cl. ...................... 422/120; 422/202; 422/123; 422/122; 236/80 A
(58) Field of Classification Search ................ 422/122, 422/202, 120, 123; 236/44 R, 80 A
See application file for complete search history.

(56) References Cited

U.S. PATENT DOCUMENTS 3,486,332 A    12/1969   Robertson et al.
4,829,997 A  *  5/1989   Douwens et al. ...... 128/201.13
5,435,150 A  *  7/1995   Khelifa et al. ................ 62/271
6,223,519 B1 *  5/2001   Basu et al. ..................... 60/783

FOREIGN PATENT DOCUMENTS

| DE | 20 20 856 | 11/1970 |
|---|---|---|
| FR | 2 643 140 | 8/1990 |
| WO | WO 94 11682 | 5/1994 |

* cited by examiner

*Primary Examiner*—N. Bhat
(74) *Attorney, Agent, or Firm*—Gerald E. Helget; Nelson R. Capes; Briggs and Morgan, P.A.

(57) ABSTRACT

This invention concerns a steam generator (100) intended to humidify the air in an enclosed space or the air treated in an air conditioning system, particularly an air conditioning system aboard an aircraft, said steam generator (100) comprising at least one tank (110) intended to contain a water-based fluid (E), said or each tank (110) being connected to a heat exchanger (210) intended to convert the fluid (E) into steam.

The steam generator (100) is remarkable in that the heat source connected to the heat exchanger (210) is a thermo-chemical reactor (230).

12 Claims, 2 Drawing Sheets

STEAM GENERATOR

This invention concerns a steam generator intended to humidify the air of an enclosed space or the air treated by an air conditioning system, particularly an aircraft air conditioning system.

To humidify the air of an enclosed space, we can install a steam generator in this space. Traditionally, this type of steam generator includes a water tank that is provided with an opening and that is connected to a heating unit most often consisting of an electrical resistor. The activation of the electrical resistor heats the water, then vaporizes it. The steam produced is discharged through the opening in the tank and humidifies the air in the enclosed space.

This tank may also be connected, through the intermediary of a conduit terminated by a diffuser, to a supply duct of an air conditioning system. A control unit may also be connected to the air conditioning system to regulate the steam production of the steam generator in the supply duct, by acting, more particularly, on the electrical voltage delivered to the terminals of the electrical resistor to obtain an appropriate humidity level in the enclosed space into which the supply duct opens.

A source of electrical current such as a battery or an electric generator must be used to supply current to the electrical resistor of the steam generator. Therefore, this steam generator can be installed only in a location connected to a source of electrical current.

Furthermore, the bulk of this current source proves to be a constraint when this involves a system for conditioning the air aboard an aircraft.

The purpose of the invention is therefore to propose an autonomous steam generator intended to humidify the air of an enclosed space or the air treated in an air conditioning system, particularly aboard an aircraft, and whose steam generator does not require the use of a source of electrical current as heating energy.

To this end, the steam generator according to the invention that is intended to humidify the air in an enclosed space or the air treated in an air conditioning system, particularly an air conditioning system aboard an aircraft, said steam generator comprising at least one tank designed to contain a water-based fluid, said or each tank being connected to a heat exchanger intended to convert the fluid into steam, is remarkable in that the source of heat connected to the heat exchanger is a thermochemical reactor.

Thus, the steam generator may function autonomously.

According to another feature of the invention, the thermochemical reactor consists of a first tank intended to contain a reagent that produces an exothermic reaction when it is combined with another reagent contained in a second tank, the heat exchanger comprising an envelop in which the first tank is housed.

According to another feature of the invention, the first tank is coaxial to the envelope.

According to another feature of the invention, the first reagent is a composite of calcium chloride and expanded natural graphite and the other reagent is an ammonia gas.

According to another feature of the invention, the envelope is made of metal.

According to another feature of the invention, the envelope comprises an opening connected to a discharge outlet that is intended to allow diffusion of the steam.

According to another feature of the invention, the envelope comprises an opening connected to a discharge outlet whose free end opens into a duct of an air conditioning system.

According to another feature of the invention, the free end of the conduit is equipped with a diffuser.

According to another feature of the invention, the envelope is equipped with a pressure safety valve intended to make it possible to keep the fluid under steam pressure while it is vaporized in said envelope.

According to another feature of the invention, the fluid tank is connected, through the intermediary of distribution piping, to the heat exchanger, the distribution piping being equipped with a valve allowing one to control the flow rate of the fluid toward the heat exchanger.

According to another feature, the valve or valves are motorized and are controlled by a control unit that allows one to adjust the flow rate of the steam produced by the steam generator.

The features of the invention mentioned above, as well as others, will become clearer upon reading the following description of an example of embodiment, said description being given in relation to the appended drawings, in which:

Figure 1:
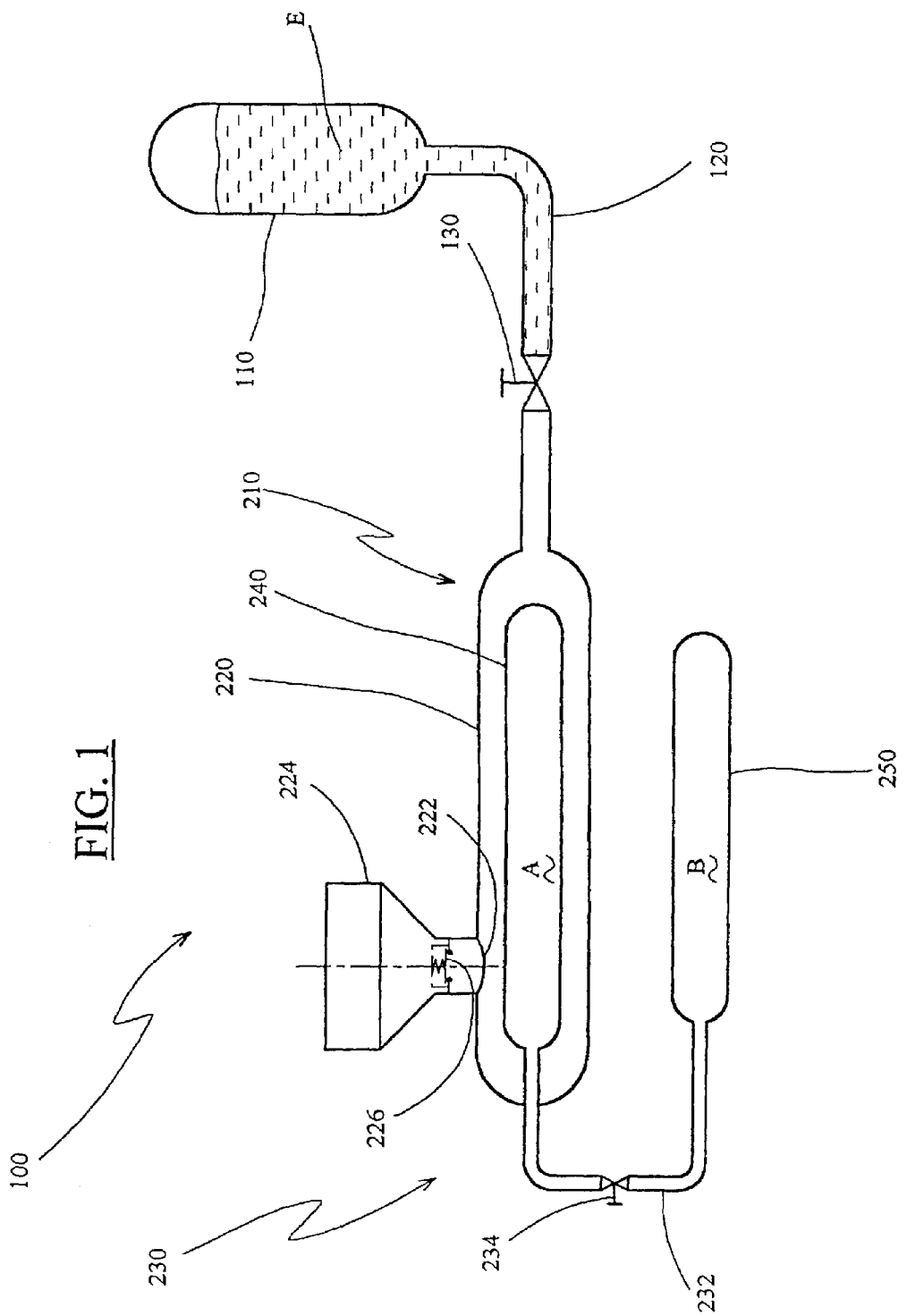
FIG. 1 shows a sectional view of a steam generator according to the invention and, FIG. 2 shows a sectional view of a steam generator connected to a duct of an air conditioning system according to the invention.

The steam generator (100) shown in FIG. 1 is intended to produce steam to humidify the air in a closed space to be air conditioned in which it is installed.

The steam generator (100) consists, more particularly, of a tank (110) and a heat exchanger (210).

The tank (110) is intended to contain a water-based fluid (E). It is connected at a low section, through the intermediary of distribution piping (120) to the heat exchanger (210) to allow the fluid (E) to flow toward said heat exchanger (210). A valve (130) is installed on the distribution piping (120) to allow the adjustment of the flow rate of the fluid (E) toward the heat exchanger (210). To allow the fluid (E) to flow toward the heat exchanger (210), the tank (110) is positioned above said heat exchanger (210) or is pressurized.

The heat exchanges (210) includes an envelope (220), that is cylindrical in shape, shown in FIG. 1. This envelope (220) is intended to receive the fluid (E) so that it can be converted into steam and thus be used as a humidifying agent. This envelope (220) is isothermal. It also comprises an opening (222) connected to a discharge outlet (224) that is intended to allow the diffusion of the steam produced by the steam generator (100) in the enclosed space where it is installed. The discharge outlet (224) or the opening (222) may be equipped, in a mode of embodiment shown in FIG. 1, with a pressure safety valve (226) that is intended to make it possible to keep the fluid (E) under steam pressure when it is being vaporized in said envelope (220).

The heat exchanger (210) is connected to a heat source that, advantageously, is a thermochemical reactor (230). This thermochemical reactor (230) is, for example, a solid/gas reactor that can function in reversible endothermic mode in order to allow its regeneration.

It includes a first tank (240) that is connected to the heat exchanger (210) and a second tank (250), both hermetically sealed.

This first tank (240) has good heat conducting characteristics. It is preferably made of metal. In a preferred mode of embodiment, the first tank (240) is housed inside the envelope (220) and preferably coaxial to it. Thus, in this way, the fluid (E) can be confined between the envelope (220) and the first tank (240). This tank is intended to contain a reagent (A), for example, a composite of calcium chloride and expanded natural graphite that produces an exothermic reaction when it is combined with another reagent (B), for example an ammonia gas contained in the second tank (250). To bring reagent (B) into contact with reagent (A) contained in the first tank (240), the two tanks (240 and 250) are connected by distribution piping (232) equipped with a valve (234).

In a mode of embodiment not shown, the valves (130) and/or (234) are power-operated and are controlled by a control unit that makes it possible to regulate the flow rate of the steam produced by the steam generator (100).

The steam generator (100) is installed in the enclosed space to be conditioned. A water-based fluid (E) is introduced into the tank (110) and the thermochemical reactor (230) is conditioned to be able to function.

The valve (130) is opened and adjusted so that the fluid (E) can flow toward the heat exchanger (210) according to a determined flow rate.

The valve (234) is also opened and adjusted so as to allow a calibrated flow rate for reagent (B) contained in the second tank (250) toward the first tank (240) to react with reagent (A) and to produce an exothermic chemical reaction in said first tank (240). The temperature of the first tank then rises to become higher than the boiling point of fluid (E). Fluid E evaporates progressively and is evacuated through the opening (222) in the discharge outlet (224) that then diffuses the steam produced to humidify the air of the enclosed space.

The steam generator according to the invention can function autonomously, without being connected to a source of electrical current as heating energy.

Figure 2:
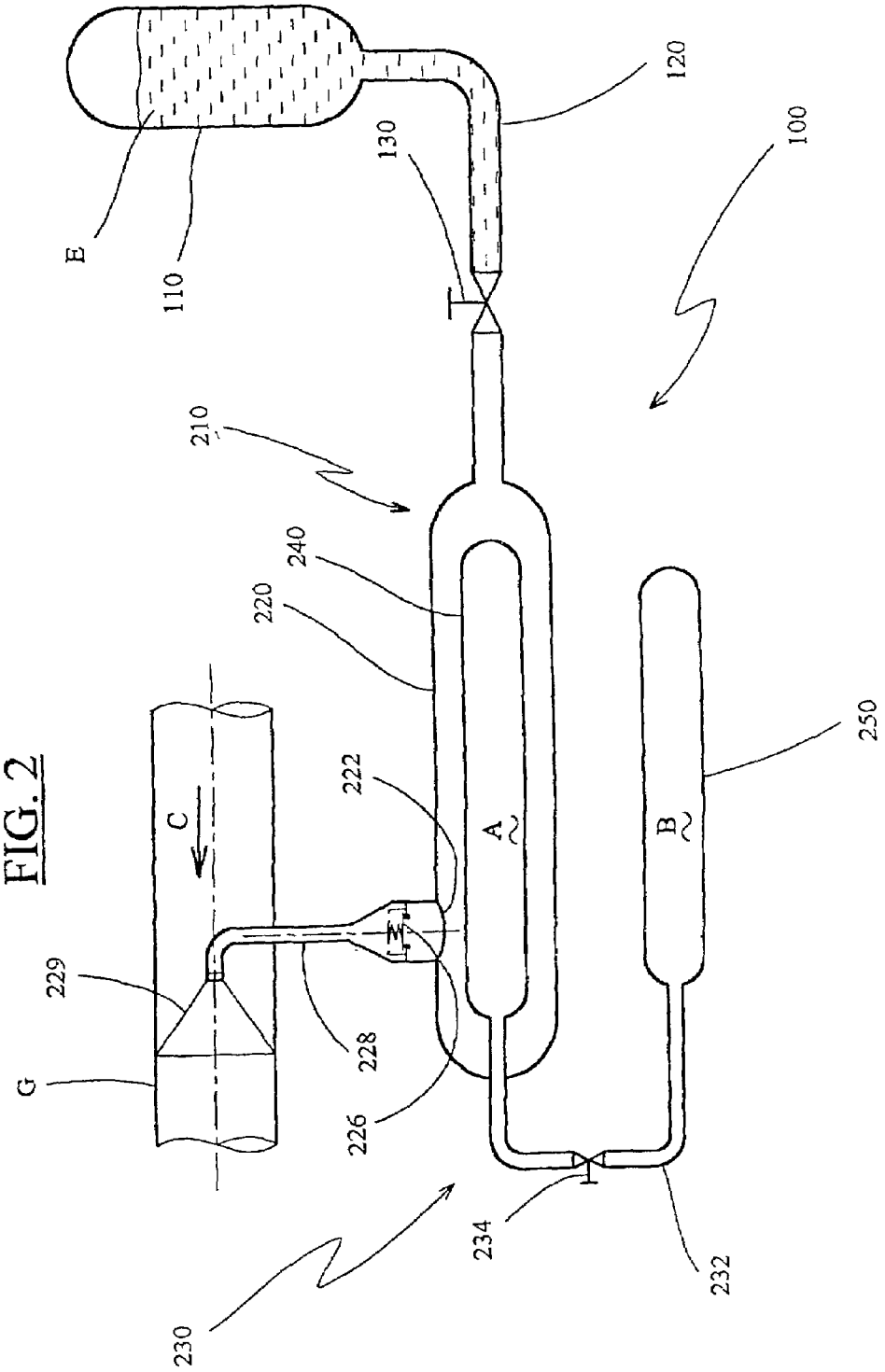

FIG. 2 shows a variant of embodiment of a steam generator (100). It is designed to be connected to a duct (G) of an air conditioning system, particularly an air conditioning system aboard an aircraft. A conduit (228) is connected for this purpose by one extremity to the opening (222) and opens at its other extremity, equipped with a diffuser (229), into the duct (G). Note that diffuser (229) is oriented in a direction parallel to the direction of airflow into said duct (G), indicated by the arrow C in FIG. 2.

When the steam generator (100) functions, the vaporized fluid (E) is diffused into said duct (G).

The conduit (228) can also be equipped with a pressure safety valve (226).

The invention claimed is:

1. An air-humidifying steam generator which humidifies air in an aircraft air conditioning system, comprising:
    an air conditioning system;
    a heat exchanger comprised of an envelope;
    at least one first tank containing a water-based fluid, said or each tank is connected to the heat exchanger;
    a thermochemical reactor connected to the heat exchanger, the thermochemical reactor consisting of a second tank containing a first reagent and a third tank containing a second a second reagent;
    a steam discharge outlet connected to the envelope and to the air conditioning system; wherein the envelope is about the second tank;
    wherein the first reagent and the second reagent are combined to create a thermochemical reaction in the second tank; converting the water-based fluid held in the envelope into steam; and
    wherein the steam is released into the aircraft air conditioning system through the steam discharge outlet.

2. The steam generator in claim 1, wherein the envelope houses the second tank in a coaxial orientation.

3. The steam generator in claim 2, wherein the first reagent is a composite of calcium chloride and expanded natural graphite and the second reagent is an ammonia gas.

4. The steam generator in claim 3, wherein the envelope is made of metal.

5. The steam generator in claim 4, further comprising a conduit with a free open end, wherein the air conditioning system having a duct; and wherein the steam discharge outlet connects to the conduit, and the free open end opens into the duct of the air conditioning system.

6. The steam generator in claim 5, wherein the free open end of the conduit is equipped with a diffuser.

7. The steam generator in claim 6, wherein the envelope is equipped with a pressure safety valve which keeps the fluid under steam pressure while the fluid is being vaporized in said envelope.

8. The steam generator in claim 7, wherein the first tank is connected, through an intermediary of distribution piping to the heat exchanger, the distribution piping equipped with a valve allowing adjustment of the flow rate of the fluid toward the heat exchanger.

9. The steam generator in claim 8, wherein the third tank is connected through a valve to the first tank.

10. The steam generator in claim 9, further comprising a control unit, and wherein the valves are power-operated and controlled by the control unit allowing adjustment of the flow rate of the steam produced by the steam generator.

11. An air-humidifying steam generator which humidifies air in an aircraft air conditioning system, comprising:
    an air conditioning system;
    a heat exchanger comprised of an envelope;
    at least one first tank containing a water-based fluid, said or each tank is connected to the heat exchanger;
    a thermochemical reactor connected to the heat exchanger, the thermochemical reactor consisting of a second tank containing a first reagent and a third tank containing a second reagent;
    a steam discharge outlet equipped with a diffuser, the steam discharge outlet connected to the envelope and to the air conditioning system;
    wherein the envelope is about the second tank in coaxial orientation;
    wherein the first reagent and the second reagent are combined to create a thermochemical reaction in the second tank, converting the water-based fluid held in the envelope into steam; and
    wherein the steam is released into the aircraft air conditioning system through the steam discharge outlet.

12. An air-humidifying steam generator which humidifies air in an aircraft air conditioning system, comprising;
    an air conditioning system;
    a heat exchanger comprised of a metal envelope;
    at least one first tank containing a water-based fluid, said or each tank is connected to the heat exchanger;
    a thermochemical reactor connected to the heat exchanger, the thermochemical reactor consisting of a second tank containing a first reagent and a third tank containing a second reagent;
    a steam discharge outlet equipped with a diffuser, the steam discharge outlet connected to the envelope and to the air conditioning system;

wherein the envelope is about the second tank, in a coaxial orientation;

wherein the first reagent is a composite of calcium chloride and expanded natural graphite and the second reagent is an ammonia gas, wherein the first reagent and the second reagent are combined to create a thermochemical reaction in the second tank, converting the water-based fluid held in the envelope into steam; and wherein the steam is released into the aircraft air conditioning system through the steam discharge outl

UNITED STATES PATENT AND TRADEMARK OFFICE
CERTIFICATE OF CORRECTION

PATENT NO.          : 7,381,376 B2                                      Page 1 of 1
APPLICATION NO. : 10/050210
DATED               : June 3, 2008
INVENTOR(S)         : Guy-Paul Alix and Stephane Lintanff It is certified that error appears in the above-identified patent and that said Letters Patent is hereby corrected as shown below:

In column 3, line 58 please delete "containing a second a second reagent;", and in its place --containing a second reagent;--.

Signed and Sealed this

Twenty-seventh Day of October, 2009

David J. Kappos
*Director of the United States Patent and Trademark Office*